United States Patent
Wang

(10) Patent No.: US 10,769,843 B1
(45) Date of Patent: Sep. 8, 2020

(54) 3D SCENE ENGINEERING SIMULATION AND REAL-LIFE SCENE FUSION SYSTEM

(71) Applicant: HONGFUJIN PRECISION ELECTRONICS(TIANJIN)CO., LTD., Tianjin (CN)

(72) Inventor: Shih-Cheng Wang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/598,745

(22) Filed: Oct. 10, 2019

(30) Foreign Application Priority Data

Jul. 31, 2019 (CN) .......................... 2019 1 0702999

(51) Int. Cl.
  *G06T 15/20* (2011.01)
(52) U.S. Cl.
  CPC .......... *G06T 15/20* (2013.01); *G06T 2215/16* (2013.01)
(58) Field of Classification Search
  None
  See application file for complete search history.

(56) References Cited

U.S. PATENT DOCUMENTS

| | | | |
|---|---|---|---|
| 2013/0073619 A1* | 3/2013 | Tumuluri | H04N 13/167 709/204 |
| 2015/0109415 A1* | 4/2015 | Son | G01B 11/22 348/46 |
| 2019/0206037 A1* | 7/2019 | Wu | A63F 13/65 |

* cited by examiner

*Primary Examiner* — Frank S Chen
(74) *Attorney, Agent, or Firm* — ScienBiziP, P.C.

(57) ABSTRACT

A method performs 3D scene engineering simulation and real-life scene fusion. The method includes obtaining 3D coordinates of each point of a 3D model of a real-life scene, obtaining engineering data corresponding to the 3D coordinates of each point, acquiring location information of each point, establishing a correspondence between the 3D coordinates of each point and the location information of each point in the real-life scene, providing a scene fusion interactive interface on a mobile terminal, acquiring an image of a target scene in the real-life scene, acquiring location information and orientation information of the mobile terminal, determining 3D coordinates corresponding to the location information of the mobile terminal, determining a 3D coordinate range, and merging the engineering data corresponding to the 3D coordinate range into the image of the target scene.

17 Claims, 4 Drawing Sheets

3D SCENE ENGINEERING SIMULATION AND REAL-LIFE SCENE FUSION SYSTEM

FIELD

The subject matter herein generally relates to 3D simulation technology, and more particularly to a 3D scene engineering simulation and real-life scene fusion system and method.

BACKGROUND

Generally, engineering simulation software is based on a geometric object of a real-life scene to model and analyze a simulated image. However, the real-life scene is generally superimposed on a surface of the simulated image, which cannot allow an analyst to observe specific details in the real-life scene.

BRIEF DESCRIPTION OF THE DRAWINGS

Implementations of the present disclosure will now be described, by way of embodiments, with reference to the attached figures.

DETAILED DESCRIPTION

Figure 1:
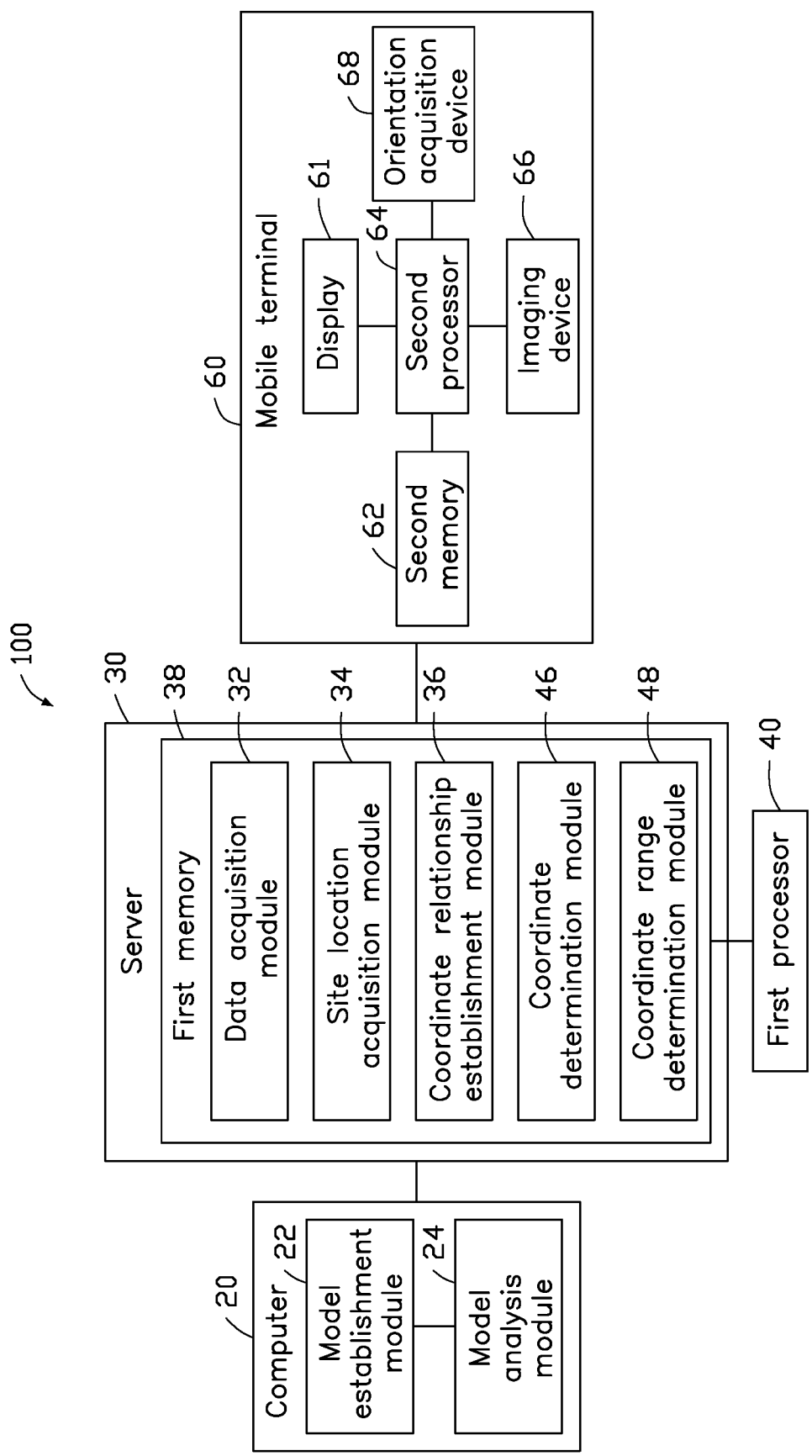
FIG. 1 is a schematic block diagram of an embodiment of a 3D scene engineering simulation and real-life scene fusion system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
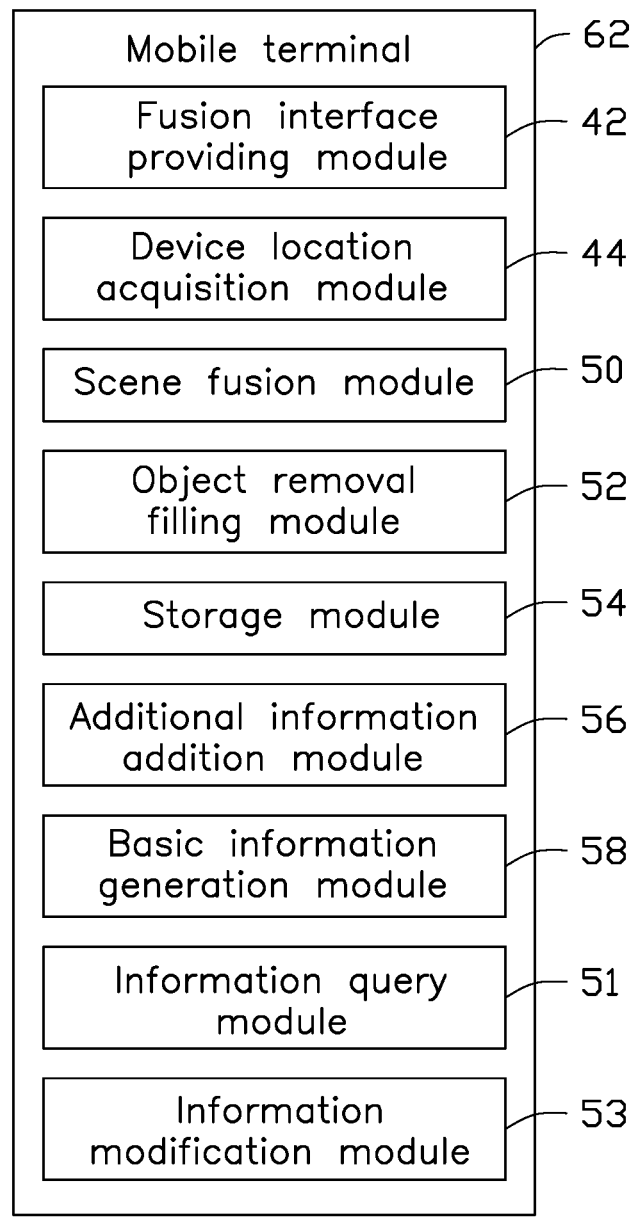
FIG. 2 is a block diagram of a second memory in FIG. 1.

FIG. 1 and FIG. 2 show an embodiment of a three-dimensional scene engineering simulation and real-life scene fusion system 100 (hereinafter "the 3D system 100"). The 3D system 100 is used for combining engineering data simulated according to a three-dimensional model with a real-life scene to obtain a realistic scene engineering simulation image, so that an observer can intuitively understand an engineering condition of the real-life scene. The 3D system 100 includes a model establishment module 22, a model analysis module 24, a data acquisition module 32, a site location acquisition module 34, a coordinate relationship establishment module 36, a fusion interface providing module 42, a device location acquisition module 44, a coordinate determination module 46, a coordinate range determination module 48, and a scene fusion module 50.

The model establishment module 22 is configured to create a three-dimensional model of a real-life scene. The model analysis module 24 is configured to analyze the three-dimensional model to obtain engineering data. The engineering data may include data of various engineering parameters, such as a temperature distribution map, a velocity distribution map, a pressure distribution map, a concentration distribution map, and a smoke flow distribution map. The engineering data can be static or dynamic 2/3D post-processed visual images, such as a transient two/three-dimensional temperature distribution map at a certain time, or a dynamic two/three-dimensional temperature change map over a certain period of time. The model establishment module 22 and the model analysis module 24 may be integrated in an engineering analysis software (such as Fire Dynamics Simulator, FDS for short), and the engineering analysis software is run on a computer 20.

The data acquisition module 32 is configured to acquire three-dimensional coordinates of each point of the three-dimensional model and acquire engineering data corresponding to the three-dimensional coordinates of each point. For example, a point temperature of a coordinate (0, 0, 0) in the three-dimensional model is 100 degrees Celsius.

The site location acquisition module 34 is configured to acquire location information of at least one point of the real-life scene. The location information may include a longitude and a latitude, and the location information may be pre-stored. The longitude and latitude can be obtained from a Global Positioning System (GPS).

The coordinate relationship establishment module 36 is configured to establish three-dimensional coordinates of each point of the three-dimensional model and position information of each point of the real-life scene according to the acquired position information of the at least one point and the three-dimensional coordinates corresponding to the at least one point. Since the three-dimensional model is based on the real-life scene, a geometric boundary of the three-dimensional model corresponds to a geometric boundary of the real-life scene, and a start point and end point of the geometric boundary of the three-dimensional model and a corresponding start point and end point of the real-life scene are used as a reference to establish a correspondence between the three-dimensional model and the real-life scene.

For example, a latitude and longitude of a corner portion of a real-life building is obtained by a GPS device, and the latitude and longitude of the corner portion are stored. A model of the real-life building is established by using the corner portion as a start point for modeling, and then establishes a correspondence relationship with the start point according to the stored latitude and longitude of the corner portion and determines a conversion relationship and an offset direction and distance of the coordinates according to the latitude and longitude, thereby determining the latitude and longitude corresponding to each point of the model.

The data acquisition module 32, the site location acquisition module 34, and the coordinate relationship establishment module 36 are stored in a first memory 38 and executed by a first processor 40. The first memory 38 and the first processor 40 belong to a server 30, and the server 30 is communicatively coupled to the computer 20.

The fusion interface providing module 42 is configured to provide a scene fusion interaction interface on a display screen 61 of a mobile terminal 60 to cause the mobile terminal 60 to enter a scene fusion mode. The mobile terminal 60 can be a mobile phone, a tablet, or the like. The mobile terminal 60 includes a second memory 62, a second processor 64, an imaging device 66, and an orientation acquisition device 68. The device location acquisition module 44 is stored in the second memory 62 and executed by the second processor 64.

The imaging device 66 is configured to acquire an image of a target scene in the real-life scene in real time in response to a user operation of capturing an image on the display screen 61 when the mobile terminal 60 is in the scene fusion mode. In one embodiment, the imaging device 66 is a camera of the mobile terminal 60. If the imaging device 66 on the mobile terminal 60 is operated in a camera mode, the captured image is displayed on the display 61. The device location acquisition module 44 is configured to acquire location information of the mobile terminal 60. The device location acquisition module 44 can be a GPS of the mobile terminal 60. The orientation acquisition device 68 is configured to acquire orientation information of the mobile terminal 60. The orientation acquisition device 68 can be a gyroscope of the mobile terminal 60.

The coordinate determination module 46 is configured to determine three-dimensional coordinates corresponding to the position information of the mobile terminal 60 in the three-dimensional model according to the correspondence relationship and the position information of the mobile terminal 60. The coordinate range determination module 48 is configured to determine a three-dimensional coordinate range corresponding to the acquired image according to the three-dimensional model, the determined three-dimensional coordinates, the orientation information, and a size of the display screen 61 of the mobile terminal 60.

Specifically, according to the orientation information and the determined three-dimensional coordinates of the mobile terminal, a facing direction of the mobile terminal 60 in the three-dimensional model is determined. Then, according to the size of the display screen 61, the facing direction, location of the mobile terminal 60 in the three-dimensional model and a distance of the facing direction of the mobile terminal 60 in the three-dimensional model, a range of capture of the mobile terminal 60 in the three-dimensional model is determined to determine the three-dimensional coordinate range. The coordinate determination module 46 and the coordinate range determination module 48 are stored in the first memory 38 and executed by the first processor 40.

The scene fusion module 50 is configured to fuse the engineering data corresponding to the three-dimensional coordinate range into the image of the target scene to form a realistic simulation image in which the engineering data is integrated. If the target scene includes a wall, the engineering data includes a temperature change map of the wall, and different temperatures in the temperature change map are represented by different colors, so that the wall in the simulated image will have color information to display on the display screen 61. In one embodiment, the scene fusion interaction interface provides a plurality of alternative fusion options, and each fusion option represents different engineering parameters to be fused, such as temperature distributions, speed distributions, and the like. The scene fusion module 50 fuses the engineering data corresponding to the selected fusion option into the image of the target scene according to the selected fusion option.

The 3D system 100 further includes an object removal filling module 52, a storage module 54, an additional information addition module 56, a basic information generation module 58, an information query module 51, and an information modification module 53.

The object removal filling module 52 is configured to remove an object selected in the image of the target scene and fill in an empty space of the removed object according to a peripheral area around the removed object. For example, if the image of the target scene includes a wall and a lamp fixed on the wall, if the lamp is selected for removal, the object removal filling module 52 removes the lamp and fills in the empty space with the wall.

The storage module 54 is configured to save the real-life scene simulation image to the second memory 62 in real time. It can be understood that the real-life scene simulation image may also be stored in the server 30 in real time.

The additional information addition module 56 is configured to add additional information onto the real-life scene simulation image according to a user operation on the display screen 61. The additional information includes, but is not limited to, text, sound, pictures, audio, video, and the like. In this way, additional information can be added on the realistic scene simulation image as needed.

The basic information generation module 58 is configured to automatically add identity information of a user who added the additional information and system time information, so that the user who added the additional information and the added time can be known when viewing.

The information query module 51 is configured to query the additional information according to a user operation on the display screen 61.

The information modification module 53 is configured to modify the additional information according to a user operation modifying the information on the display screen 61.

In one embodiment, the object removal filling module 52, the storage module 54, the additional information addition module 56, the basic information generation module 58, the information query module 51, and the information modification module 53 are stored in the second memory 62 and executed by the second processor 64. In another embodiment, the object removal and filling module 52, the storage module 54, the additional information addition module 56, the basic information generation module 58, the information query module 51, and the information modification module 53 can be stored in the first memory 38 and executed by the first processor 40, such that the mobile terminal 60 transmits the image to the server 30 in real time, thereby enabling remote operation of the image from the mobile terminal 60.

In another embodiment, the model establishment module 22, the model analysis module 24, the data acquisition module 32, the site location acquisition module 34, the coordinate relationship establishment module 36, the coordinate determination module 46, and the coordinate range determination module 48 can be stored in the second memory 62 and executed by the second processor 64. In this way, only the mobile terminal 60 can perform the fusion of the real-life scene and the engineering data.

Figure 3:
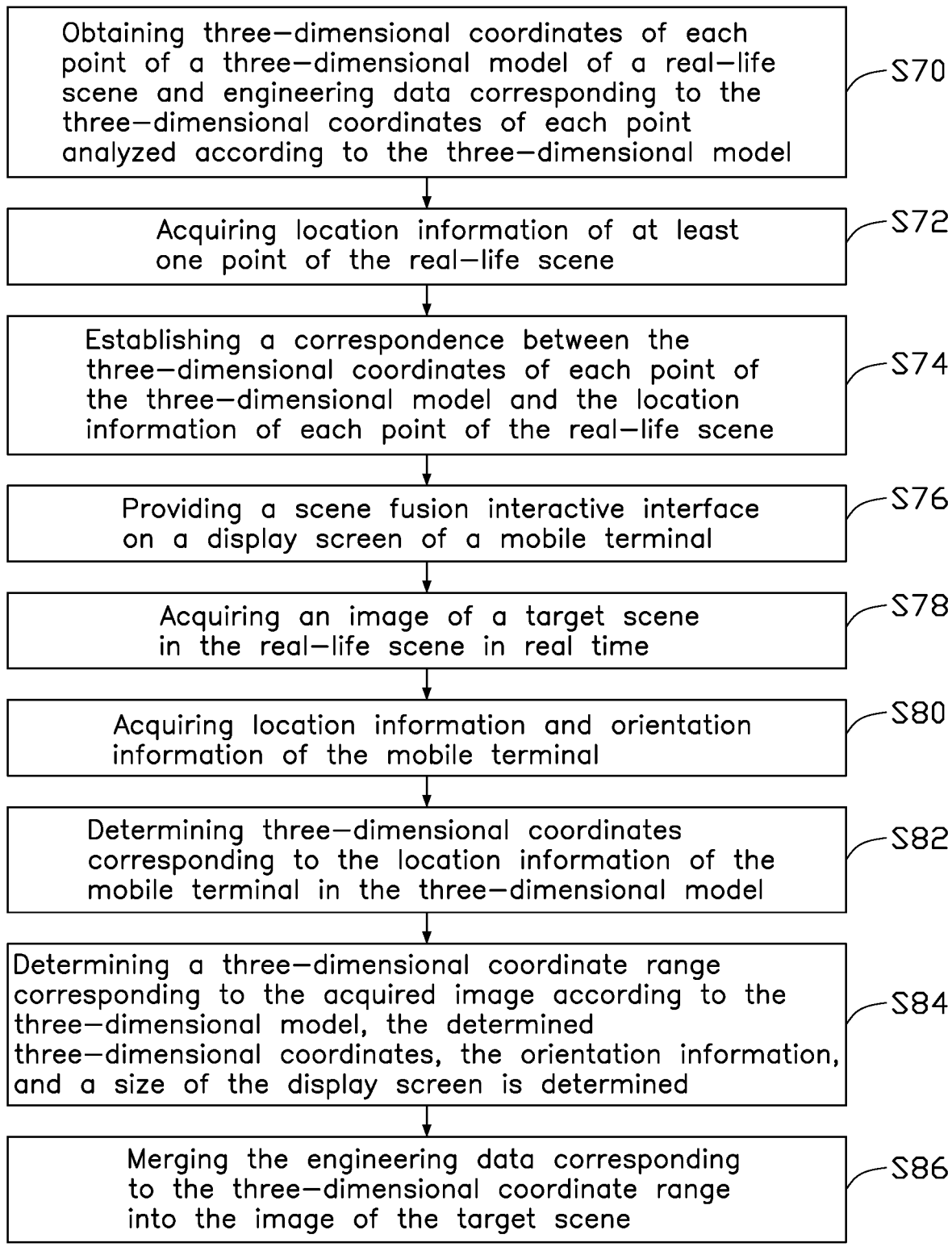
FIG. 3 is a flowchart of an embodiment of a method for performing 3D scene engineering simulation and real-life scene fusion system.

FIG. 3 shows a flowchart of an embodiment of a method for performing three-dimensional scene engineering simulation and real-life scene fusion.

At block S70, three-dimensional coordinates of each point of a three-dimensional model of a real-life scene and engineering data corresponding to the three-dimensional coordinates of each point analyzed according to the three-dimensional model are obtained. The three-dimensional coordinates and the engineering data may be obtained from data obtained from an engineering analysis software for establishing and analyzing the three-dimensional model.

At block S72, location information of at least one point of the real-life scene is acquired. The location information may include a longitude and a latitude, and the longitude and latitude may be obtained from a Global Positioning System (GPS).

At block S74, a correspondence between the three-dimensional coordinates of each point of the three-dimensional model and the location information of each point of the real-life scene is established according to the acquired location information of the at least one point of the real-life scene and the three-dimensional coordinates corresponding to the at least one point.

At block S76, a scene fusion interactive interface is provided on a display screen of a mobile terminal. The mobile terminal can be a mobile phone, a tablet, or the like.

At block S78, an image of a target scene in the real-life scene is acquired in real time in response to an operation of capturing an image on the display screen.

At block S80, location information and orientation information of the mobile terminal are acquired.

At block S82, three-dimensional coordinates corresponding to the location information of the mobile terminal in the three-dimensional model according to the correspondence relationship and the location information of the mobile terminal are determined.

At block S84, a three-dimensional coordinate range corresponding to the acquired image according to the three-dimensional model, the determined three-dimensional coordinates, the orientation information, and a size of the display screen is determined.

At block S86, the engineering data corresponding to the three-dimensional coordinate range is merged into the image of the target scene according to an operation of merging the scene on the display screen to form a realistic scene engineering simulation image in which the engineering data is integrated.

Figure 4:
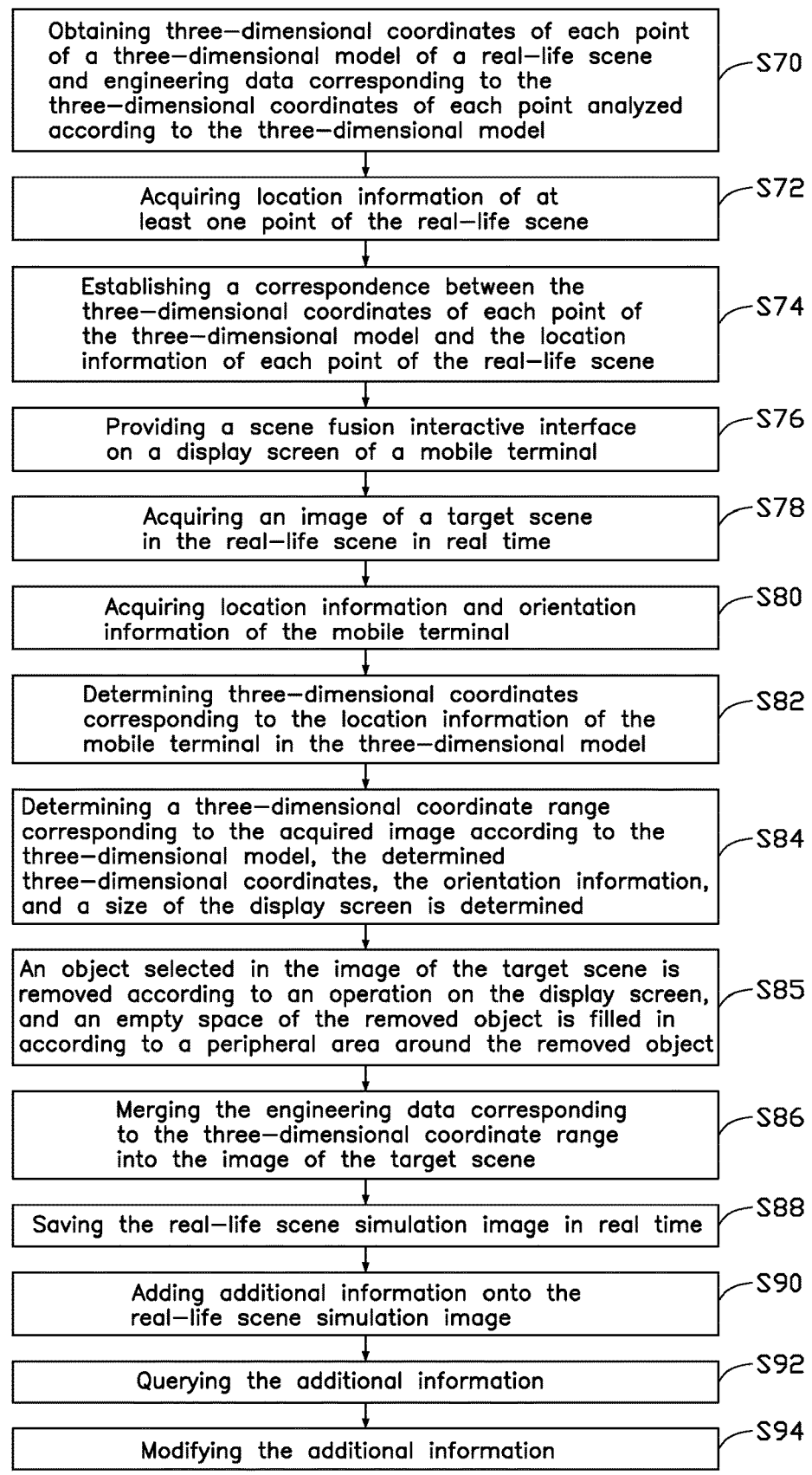
FIG. 4 is similar to FIG. 3, but showing additional blocks of the method of FIG. 3.

Referring to FIG. 4, in another embodiment, the method for performing three-dimensional scene engineering simulation and real-life scene fusion further includes the following blocks.

At block S85, an object selected in the image of the target scene is removed according to an operation on the display screen, and an empty space of the removed object is filled in according to a peripheral area around the removed object.

At block S86, the engineering data corresponding to the three-dimensional coordinate range is merged into the image of the target scene according to an operation of merging the scene on the display screen to form a realistic scene engineering simulation image in which the engineering data is integrated.

At block S88, the real-life scene simulation image is saved in real time.

At block S90, additional information is added onto the real-life scene simulation image according to an operation of adding information on the display screen, and identity information of a user who added the additional information and system time information are automatically added.

At block S92, the additional information is queried according to an operation of querying information on the display screen.

At block S94, the additional information is modified according to an operation of modifying information on the display screen.

The above-mentioned 3D system 100 and the method for performing three-dimensional scene engineering simulation and real-life scene fusion can fuse the engineering data into the image of the target scene when the image of the target scene in the real-life scene is acquired in real time. Compared to the related art, the engineering data is more realistically integrated with the real-life scene to provide a more suitable environment for analysis of the real-life scene. Furthermore, the real-life scene simulation image can also be amended to add, modify, and query through the scene fusion interactive interface to realize human-computer interaction, which provides a more comprehensive analysis result.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A three-dimensional scene engineering simulation and real-life scene fusion system (3D system) comprising:
   at least one processor; and
   at least one memory storing a plurality of instructions, which when executed by the at least one processor, cause the processor to:
   obtain three-dimensional coordinates of each point of a three-dimensional model of a real-life scene;
   obtain engineering data corresponding to the three-dimensional coordinates of each point analyzed according to the three-dimensional model;
   acquire location information of at least one point of the real-life scene;
   establish a correspondence between the three-dimensional coordinates of each point of the three-dimensional model and the location information of the at least one point of the real-life scene according to the acquired location information of the at least one point of the real-life scene and the three-dimensional coordinates corresponding to the at least one point;
   provide a scene fusion interactive interface on a display screen of a mobile terminal;
   acquire an image of a target scene in the real-life scene in real time in response to an operation of capturing an image on the display screen;
   acquire location information and orientation information of the mobile terminal;

determine three-dimensional coordinates corresponding to the location information of the mobile terminal in the three-dimensional model according to the correspondence relationship and the location information of the mobile terminal;

determine a three-dimensional coordinate range corresponding to the acquired image according to the three-dimensional model, the determined three-dimensional coordinates, the orientation information, and a size of the display screen; and merge the engineering data corresponding to the three-dimensional coordinate range into the image of the target scene according to an operation of merging the scene on the display screen to form a realistic scene engineering simulation image.

2. The 3D system of claim 1, wherein:
the location information comprises a longitude and a latitude; and
the longitude and latitude are obtained from a Global Positioning System (GPS).

3. The 3D system of claim 1, wherein:
the scene fusion interaction interface provides a plurality of fusion options; and
each fusion option represents different engineering parameters to be fused.

4. The 3D system of claim 1, wherein the at least one processor is further configured to:
remove an object selected in the image of the target scene and fill in an empty space of the removed object according to a peripheral area around the removed object.

5. The 3D system of claim 1, wherein the at least one processor is further configured to:
save the real-life scene simulation image in real time.

6. The 3D system of claim 1, wherein the at least one processor is further configured to:
add additional information onto the real-life scene simulation image according to an operation of adding information on the display screen; and
automatically add identity information of a user who added the additional information and system time information.

7. The 3D system of claim 6, wherein the at least one processor is further configured to:
query the additional information according to a corresponding operation on the display screen.

8. The 3D system of claim 6, wherein the at least one processor is further configured to:
modify the additional information according to a corresponding operation on the display screen.

9. The 3D system of claim 1, wherein:
the at least one memory comprises a first memory and a second memory;
the at least one processor comprises a first processor and a second processor;
the first memory and the first processor belong to a server;
the second memory and the second processor belong to a mobile terminal;
the server is communicatively coupled to the mobile terminal.

10. A method for performing three-dimensional scene engineering simulation and real-life scene fusion, the method comprising:
obtaining three-dimensional coordinates of each point of a three-dimensional model of a real-life scene;
obtaining engineering data corresponding to the three-dimensional coordinates of each point analyzed according to the three-dimensional model;
acquiring location information of at least one point of the real-life scene;
establishing a correspondence between the three-dimensional coordinates of each point of the three-dimensional model and the location information of the at least one point of the real-life scene according to the acquired location information of the at least one point of the real-life scene and the three-dimensional coordinates corresponding to the at least one point;
providing a scene fusion interactive interface on a display screen of a mobile terminal;
acquiring an image of a target scene in the real-life scene in real time in response to an operation of capturing an image on the display screen;
acquiring location information and orientation information of the mobile terminal;
determining three-dimensional coordinates corresponding to the location information of the mobile terminal in the three-dimensional model according to the correspondence relationship and the location information of the mobile terminal;
determining a three-dimensional coordinate range corresponding to the acquired image according to the three-dimensional model, the determined three-dimensional coordinates, the orientation information, and a size of the display screen; and
merging the engineering data corresponding to the three-dimensional coordinate range into the image of the target scene according to an operation of merging the scene on the display screen to form a realistic scene engineering simulation image.

11. The method of claim 10, wherein:
the location information comprises a longitude and a latitude; and
the longitude and latitude are obtained from a Global Positioning System (GPS).

12. The method of claim 10, wherein:
the scene fusion interaction interface provides a plurality of fusion options; and each fusion option represents different engineering parameters to be fused.

13. The method of claim 10, further comprising:
removing an object selected in the image of the target scene and fill in an empty space of the removed object according to a peripheral area around the removed object.

14. The method of claim 10, further comprising:
saving the real-life scene simulation image in real time.

15. The method of claim 10, further comprising:
adding additional information onto the real-life scene simulation image according to an operation of adding information on the display screen; and
automatically adding identity information of a user who added the additional information and system time information.

16. The method of claim 10, further comprising:
querying the additional information according to a corresponding operation on the display screen.

17. The method of claim 10, further comprising:
modifying the additional information according to a corresponding operation on the display screen.

* * * * *